(12) United States Patent
Magunia et al.

(10) Patent No.: US 9,902,110 B2
(45) Date of Patent: Feb. 27, 2018

(54) TRIM PART HAVING GLUED AIRBAG SYSTEM

(71) Applicant: Lisa Draexlmaier GmbH, Vilsbiburg (DE)

(72) Inventors: Robert Magunia, Geisenhausen (DE); Nina Pogadl, Landshut (DE); Marcus Lanzinger, Landshut (DE); Josef Seebauer, Kumhausen (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 0 days.

(21) Appl. No.: 15/195,272

(22) Filed: Jun. 28, 2016

(65) Prior Publication Data

US 2016/0375634 A1 Dec. 29, 2016

(30) Foreign Application Priority Data

Jun. 29, 2015 (DE) .......................... 10 2015 110 403

(51) Int. Cl.
*B60R 21/215* (2011.01)
*B29C 65/48* (2006.01)
(Continued)

(52) U.S. Cl.
CPC ...... *B29C 65/4845* (2013.01); *B29C 35/0805* (2013.01); *B60R 21/215* (2013.01); *B60R 21/2165* (2013.01); *B29C 65/04* (2013.01); *B29C 65/08* (2013.01); *B29C 65/1425* (2013.01); *B29C 65/483* (2013.01);
(Continued)

(58) Field of Classification Search
CPC .............. B60R 21/215; B60R 21/2165; B60R 2021/21506
See application file for complete search history.

(56) References Cited

U.S. PATENT DOCUMENTS 6,333,515 B1 * 12/2001 Kubota ............... B60R 13/0206
280/728.1
8,474,861 B1 * 7/2013 Twork ................... B60R 21/215
280/728.3
(Continued)

FOREIGN PATENT DOCUMENTS

DE 101 60 185 B4 6/2003
DE 200 23 347 U1 10/2003
(Continued)

*Primary Examiner* — Drew J Brown
(74) *Attorney, Agent, or Firm* — Finnegan, Henderson, Farabow, Garrett & Dunner LLP (57) ABSTRACT

Embodiments disclose a trim part comprising an airbag system for the interior of a motor vehicle. The trim part comprises a carrier, on which an airbag module is disposed. A joint is formed at least in sections between the carrier and the airbag module. A primary connecting element, which includes an adhesive, is disposed within the joint so that the primary connecting element is non-detachably connected both to the carrier and the airbag module. The trim part further comprises at least one secondary connecting element for temporarily fixing the airbag module to the carrier before the non-detachable connection between the carrier and the airbag module is created by the primary connecting element. Embodiments further disclose a method for the production of the trim part.

19 Claims, 3 Drawing Sheets

(51) Int. Cl.
    *B60R 21/2165*     (2011.01)
    *B29C 35/08*     (2006.01)
    *B29C 65/08*     (2006.01)
    *B29C 65/14*     (2006.01)
    *B29C 65/50*     (2006.01)
    *B29C 65/60*     (2006.01)
    *B29C 65/72*     (2006.01)
    *B29C 65/78*     (2006.01)
    *B29C 65/00*     (2006.01)
    *B29C 65/04*     (2006.01)
    *B29L 31/30*     (2006.01)
    *B29K 75/00*     (2006.01)

(52) U.S. Cl.
    CPC ........ *B29C 65/485* (2013.01); *B29C 65/5057* (2013.01); *B29C 65/606* (2013.01); *B29C 65/72* (2013.01); *B29C 65/7826* (2013.01); *B29C 66/112* (2013.01); *B29C 66/131* (2013.01); *B29C 66/232* (2013.01); *B29C 66/3022* (2013.01); *B29C 66/322* (2013.01); *B29C 66/3242* (2013.01); *B29C 66/3452* (2013.01); *B29C 66/532* (2013.01); *B29C 66/5346* (2013.01); *B29C 66/55* (2013.01); *B29C 66/61* (2013.01); *B29C 66/721* (2013.01); *B29C 66/7392* (2013.01); *B29C 66/81423* (2013.01); *B29C 66/81431* (2013.01); *B29C 66/8322* (2013.01); *B29C 2035/0811* (2013.01); *B29C 2035/0855* (2013.01); *B29K 2075/00* (2013.01); *B29L 2031/3038* (2013.01); *B60R 2021/21506* (2013.01)

(56) References Cited

U.S. PATENT DOCUMENTS

| | | | |
|---|---|---|---|
| 9,457,760 B1* | 10/2016 | Raines | B60R 21/239 |
| 2004/0124613 A1* | 7/2004 | Cowelchuk | B60R 21/215 |
| | | | 280/728.2 |
| 2011/0193327 A1* | 8/2011 | Tracht | B60R 21/207 |
| | | | 280/728.2 |
| 2015/0123382 A1* | 5/2015 | Rickenbach | B60R 21/207 |
| | | | 280/728.2 |
| 2016/0200286 A1* | 7/2016 | Farrington | B60R 21/38 |
| | | | 180/274 |
| 2016/0288381 A1* | 10/2016 | Lard | B60R 21/205 |

FOREIGN PATENT DOCUMENTS

| | | |
|---|---|---|
| DE | 10 2009 034 124 A1 | 3/2011 |
| DE | 10 2014 006 070 A1 | 11/2014 |

\* cited by examiner

TRIM PART HAVING GLUED AIRBAG SYSTEM

CROSS REFERENCE TO RELATED APPLICATION

This application is based upon and claims the benefit of prior German Patent Application No. 10 2015 110 403.2, filed on Jun. 29, 2015, the entire contents of which are incorporated herein by reference.

TECHNICAL FIELD

The present disclosure relates to a trim part comprising an airbag system, which is attached to the trim part by a primary and a secondary connecting element, wherein the primary connecting element may include an adhesive so that the airbag system is non-detachably connected to the trim part.

BACKGROUND

In modern vehicles, it is customary to provide a plurality of airbags. So as not to tarnish the visual appearance of the vehicle interior, airbag systems are frequently provided on the side of the respective trim part which faces away from the observer. Because enormous forces act both on the interior trim part and on the airbag system itself in the event the airbag is triggered, the airbag system must be securely fastened to the interior trim part. This prevents, among other things, the airbag system from being blasted off the interior trim part, for example.

Prior systems, for example, would screw the airbag system to the interior trim part. To withstand the forces that arise, both the screws and the threads must be made of metal. The problem, however, is that since interior trim parts are generally made of plastic material, at least one of the connecting elements must be integrated into the plastic material of the interior trim part.

DE 10 160 185 B4 discloses an interior trim part and a method for the production thereof in which an insertion element is integrated into the interior trim part during an injection molding process. The insertion element comprises a thread to which an airbag system can later be fastened.

DE 10 2014 006 070 A1 discloses an airbag system made of plastic material that is connected to an interior trim part made of the same plastic material, for example, using an ultrasonic or infrared welding method. This system includes various drawbacks, however. For example, this method can only be carried out on the finished interior trim part. The high heat input, however, has a particularly disadvantageous effect on the decorative elements that have already been applied. The high heat input regularly causes marks on the visible side of the interior trim part, which result in damage of the part.

Furthermore, these welding methods require the plastic material of the airbag system and of the interior trim part to be partially melted in regions to establish a connection between the two components. This partial melting, however, inevitably changes the properties of the plastic material, with the possibility of drastically lowering in particular the mechanical load-bearing capacity of the plastic material.

SUMMARY

Embodiments of the present disclosure provide a trim part comprising an airbag system, in which the airbag system can be arranged on the trim part, without the arrangement adversely affecting the visible components of the trim part.

Embodiments of the present disclosure disclose a trim part comprising an airbag system for the interior of a motor vehicle having a carrier, an airbag module, at least one primary connecting element and at least one secondary connecting element. The carrier forms the supporting structure of the interior trim part and thus absorbs forces that occur and act on the interior trim part. The carrier can be made of a thermoplastic resin, for example, or a fiber composite, such as a natural fiber composite. The airbag module is disposed on the carrier, wherein a joint is formed between the carrier and the airbag module at least in sections. The carrier and the airbag module may be disposed at a defined distance with respect to each other at least in regions.

In embodiments of the present disclosure, the primary connecting element includes an adhesive, is disposed within the joint, and is non-detachably connected both to the carrier and to the airbag module. The distance between the airbag module and the carrier can be completely filled by the primary connecting element, for example by the adhesive, at least in the region in which the primary connecting element is disposed in the joint. Due to the joint, it can be ensured that sufficient adhesive material of the primary connecting element is provided between the carrier and the airbag module, so that the forces that occur when the airbag is triggered can be absorbed by the adhesive and dissipated at least to such an extent that the airbag module remains fixed to the carrier. For example, the adhesive of the primary connecting element can be composed of a one-component or two-component adhesive and can be silicone-based, epoxy system-based, polyurethane-based, or modified silane polymer-based (MS polymers).

In this context, a non-detachable connection may be understood as a connection that, under normal conditions, can only be detached by destroying the connecting element.

In embodiments of the present disclosure, the secondary connecting element is used to temporarily fix the airbag module to the carrier before the non-detachable connection between the carrier and the airbag module is created with the aid of the primary connecting element. The secondary connecting element may thus be used to pre-fix the airbag module to the carrier. The use of a secondary connecting element, after the adhesive has been applied and the airbag module arranged on the carrier, may allow the airbag module to remain fixed to the carrier at least firmly enough that the adhesive of the primary connecting element can cure without stresses. The trim part can be further processed immediately after the airbag module has been attached to the carrier. In this way, the risk of forces and thus stresses acting on the adhesive, which impair the later adhesive action of the same, can be eliminated. Moreover, further fastening elements may not be needed to ensure the functionality of the airbag system.

In embodiments of the present disclosure, the primary connecting element may include one or more adhesives. If multiple adhesives are used in the primary connecting element, the adhesives may differ in terms of the type and/or composition thereof. Due to the high temperature fluctuations to which a vehicle is exposed, it may be necessary, for example, to use multiple adhesives to establish a sufficiently strong connection between the carrier and the airbag module in all temperature ranges. For example, the primary connecting element may comprise two adhesives, wherein a first adhesive is resistant in a temperature range of 50 to 200° C., for example, and a second adhesive is resistant in a range of −40 to 50° C.

In embodiments of the present disclosure, to simplify the arrangement of the primary connecting element, for example in the joint, the primary connecting element may comprise a dimensionally stable substrate, which is covered by the adhesive. The dimensional stability allows the substrate to more easily adapt to the joint, without the function of the primary connecting element being impaired. The adhesive of the primary connecting element may have a high viscosity, so that the adhesive does not flow off the substrate under standard conditions. The substrate may be composed of a thin layer, for example of a plastic material. The layer may also comprise a textile.

In embodiments of the present disclosure, the adhesive of the primary connecting element is selected from the group of pressure-sensitive adhesives. Pressure-sensitive adhesives are characterized by viscous properties and having an accordingly sticky consistency. The adhesive or the primary connecting element may thus be distributed with great precision in the joint, without the risk arising that the adhesive, after the actual arranging step, flows into regions in which no adhesive is desired.

In embodiments of the present disclosure, to ensure that the airbag module can be detached from the carrier without damage (for example, during a necessary repair), the adhesive of the primary connecting element may be a "disbond on command" adhesive, which is able to lose the bonding function thereof as soon as the adhesive exceeds a certain temperature. To ensure that the adhesive continues to form a non-detachable connection between the airbag module and the carrier during normal use, such an adhesive may only lose the bonding function thereof beginning at a temperature of greater than 160° C., and preferably 180° C. To ensure that the heat input can take place without elements adjoining the carrier or the airbag module, such as a decorative layer, being damaged, the adhesive can be heated by way of microwaves or using comparable high-frequency radiation.

In embodiments of the present disclosure, a spacer may be disposed between the airbag module and the carrier. The spacer enables forming a joint between the airbag module and the carrier in a defined manner. The spacer may be provided, for example, in the form of a web or in the form of a dome on the carrier or on the airbag module. More than one spacer may be used. For example, multiple spacers may be disposed on the carrier or on the airbag module. In some embodiments, a certain number of spacers may be disposed on the carrier and a number of the spacers may be disposed on the airbag module. Furthermore, the height of the spacer may correspond to the width of the joint. In this context, the distance between the airbag module and the carrier may be defined by the height of the spacer, for example by the width of the joint. The spacer may have a height of 1 to 5 mm, and preferably 2 to 3 mm.

In embodiments of the present disclosure, the secondary connecting element may be disposed in or on the spacer. If the secondary connecting element is made of a mechanical connecting component, for example, such as a detent hook or a clip, said clip may be directly disposed on the spacer. The spacer may include a depression, for example, in which an adhesive is stored. This enables an easier metering and positioning of the adhesive when the airbag module is being arranged on the carrier. At the same time, the connecting elements may be directly connected to the carrier or the airbag module.

In embodiments of the present disclosure, the carrier and/or the airbag module include depressions in the region of the joint, which are filled at least partially by the primary connecting element. The depressions may be filled by the adhesive of the primary connecting element. The depressions may create adhesive reservoirs, so that a thicker adhesive layer is formed at least in certain spots. In these thickened regions, the adhesive of the primary connecting element can more efficiently absorb the forces that develop very suddenly when the airbag is triggered. In this way, the risk of the airbag module detaching from the carrier is further minimized. In some embodiments, the depressions may be disposed either only in the carrier or only in the airbag module. The depressions may be provided both in the carrier and in the airbag module. In the event that depressions are provided both in the carrier and in the airbag module, the depressions may be provided opposite one another, so that large adhesive reservoirs can be created.

In embodiments of the present disclosure, the airbag module comprises not only the airbag, but also an airbag firing channel, which during expansion of the airbag guides the airbag correspondingly in the direction of the interior trim part or in the direction of the interior of the vehicle. The airbag firing channel can accordingly include an opening, which faces the carrier. The airbag module may have a rim around the opening, on which the joint may be formed. The primary and secondary connecting elements can establish a connection between the carrier and the airbag module without impairing the opening of the airbag firing channel.

In embodiments of the present disclosure, to ensure that no adhesive of the primary connecting element enters the airbag firing channel, at least one sealing element can be disposed between the carrier and the airbag module in the region of the joint. The sealing element seals the joint with respect to the airbag firing channel. Depending on the adhesive that is used, it is possible for the adhesive to still exhibit a certain flow behavior even after the airbag module has been arranged on the carrier. If adhesive were to enter the airbag firing channel, this could prevent the airbag from deploying. At the same time, the amount of available adhesive for forming a non-detachable connection between the carrier and the airbag module decreases. The sealing element can thus, in a simple manner, prevent adhesive from entering the airbag firing channel.

In embodiments of the present disclosure, a joint height of 1 to 5 mm, and preferably 2 to 3 mm, provides a non-detachable connection between the carrier and the airbag module with the aid of the primary connecting element. A joint height in this context can be understood as the distance between the carrier and the airbag module in the region of the joint. In this region, the adhesive is sufficiently compressed between the carrier and the airbag module, the adhesive distributes across a preferably large surface area in the joint and, at the same time, a gap remains in which sufficient adhesive material is disposed to withstand the high, and suddenly occurring, forces that develop when the airbag is triggered.

In embodiments of the present disclosure, to further minimize the risk that stresses act on the adhesive of the primary connecting element while the same has not yet fully cured, the secondary connecting element may be disposed within the joint. In this way, it is also possible to absorb and dissipate forces that directly act on the carrier and/or the airbag module in the region of the joint, or on regions that directly abut the joint. It is also possible for the secondary connecting element to be disposed within the joint and surrounded by the primary connecting element at least in sections. This enables more efficient force dissipation. Furthermore, at least the connecting region in which the carrier and the airbag module are connected to each other can have a more compact design.

In embodiments of the present disclosure, to further simplify the production of a trim part according to the present disclosure, the secondary connecting element can be designed in one piece with the carrier and/or with the airbag module. The connection of the secondary connecting element may take place using a mechanical connecting technique, such as interlocking or clipping. For example, a clip may be provided in one piece on the airbag module, and a holder for the clip may be provided opposite thereof on the carrier, the holder being designed in one piece with the carrier. In this case, the airbag module is clipped onto the carrier in a simple manner. So as to increase the connecting action of the secondary connecting element, multiple secondary connecting elements can be distributed across the carrier and/or the airbag module. The secondary connecting elements generate a connection between the carrier and the airbag module.

In embodiments of the present disclosure, it is also possible to use as the secondary connecting element an adhesive that differs from the adhesive of the primary connecting element. A distinguishing feature may be the reaction time, for example, which the adhesive requires to develop the full connecting action thereof. Since the secondary connecting element must establish a connection between the carrier and the airbag module at least until the adhesive of the primary connecting element has fully cured, the adhesive used as the secondary connecting element requires a considerably shorter reaction time than the adhesive of the primary connecting element. This ensures that the secondary connecting element generates a connection between the carrier and the airbag module sufficiently quickly for the freedom of stresses to remain ensured during the reaction of the primary connecting element.

In embodiments of the present disclosure, a heat-activatable adhesive, and in particular a hot-melt adhesive, may be used. Hot-melt adhesives have the advantage that they are immediately adhesive upon reaching the melting temperature, and exhibit a joining action immediately after dropping below said temperature. In this way, a connection can be established between the carrier and the airbag module quickly and efficiently, until the primary connecting element has generated the full bonding function thereof.

In embodiments of the present disclosure, to favor the distribution of the adhesive of the primary connecting element, at least one guide rib can be disposed in the carrier or in the airbag module in the region of the joint. The guide ribs distribute a pasty or low-viscosity adhesive in a defined manner across the joint when the airbag module is being arranged on the carrier. Depending on the shape and arrangement of the guide rib, the distribution of the adhesive can thus be defined in a simple manner. The guide rib can be implemented by a rib that protrudes into the joint, or alternatively by deliberate depressions that are introduced into the carrier or the airbag module.

Embodiments of the present disclosure provide a method for producing a trim part as described above. According to the method, the at least one secondary connecting element is disposed on the airbag module or on the carrier. The carrier is inserted furthermore into a first mold, with the airbag module being inserted into a second mold. The primary connecting element is applied to or arranged on the carrier and/or the airbag module. With the aid of the molds, the airbag module is pressed against the carrier prior to or during a reaction time of the adhesive of the primary connecting element. A joint is preserved at least in sections between the airbag module and the carrier, the joint being filled at least in sections by the primary connecting element. The method according to the present disclosure furthermore comprises fixing the airbag module to the carrier by way of the second connecting element. The fixing is carried out even before the adhesive of the primary connecting element has fully cured.

Complete curing of the adhesive of the primary connecting element thus may not take place until after the step of fixing.

In embodiments of the present disclosure, the fixing by way of the secondary connecting element does not take place until after the airbag module has been pressed against the carrier. This is due to the fact that, after pressing, the parts have already been positioned and adhesive has already been distributed in the joint. The connection by way of the secondary connecting element then serves the purpose of maintaining this positioning until the reaction of the adhesive of the primary connecting element has been completed.

Since, after the airbag module has been fixed by way of the secondary connecting elements, all further forces or stresses act on the primary connecting element, the carrier and the airbag module may be removed from the first and second molds even while a reaction time or curing time of the adhesive of the primary connecting element is in progress. Because the airbag module is attached to the carrier by way of the secondary connecting element, the trim part can be removed from the molds. Positioning and fixing within the molds is no longer necessary. This not only reduces the cycle time for producing the trim part itself, but the mold or the molds can also be used more efficiently.

The reaction time of the adhesive of the primary connecting element can be understood to mean the time period that is required after activation of the adhesive until the adhesive has completely formed a bonding function, and the non-detachable connection between the carrier and the airbag module has fully developed.

In embodiments of the present disclosure, the primary connecting element can be applied onto the carrier and/or the airbag module in paste form. In the paste form, the primary connecting element is still liquid enough to be distributed on the carrier and the airbag module with little effort, but still sticky enough that it does not flow across the carrier or the airbag module in an undefined manner, and consequently is also significantly easier to meter.

In embodiments of the present disclosure, to control the reaction properties of the adhesive of the primary connecting element in a more defined manner, the adhesive of the primary connecting element may be activated only after pressing or during pressing. The activation can take place, for example, by creating the ambient conditions necessary for the reaction only once the pressing step is taking place or has taken place. It is also possible to add an agent that is necessary for the adhesive to react to the adhesive during or after the pressing step.

In embodiments of the present disclosure, the adhesive of the primary connecting element can be activated effectively, and in a way that is gentle on the material, with the aid of electromagnetic radiation, in particular microwave radiation, high-frequency radiation, or induction radiation. In this case, an adhesive is used which can be activated by an aforementioned radiation. The radiation can take place through the airbag module or the carrier if the material is selected appropriately. This not only facilitates the positioning of the airbag module on the carrier, but also exposes neither the carrier nor the airbag module to the particular radiation.

The present disclosure was described with respect to a method and a device. Unless indicated otherwise, the comments made regarding the method can be applied analogously to the device. The same applies conversely, so that the embodiments of the device also are also reflected in the method. The foregoing general description and the following detailed description are exemplary and explanatory only, and are not restrictive of embodiments consistent with the present disclosure. Further, the accompanying drawings illustrate embodiments of the present disclosure, and together with the description, serve to explain principles of the present disclosure.

DETAILED DESCRIPTION

Figure 1:
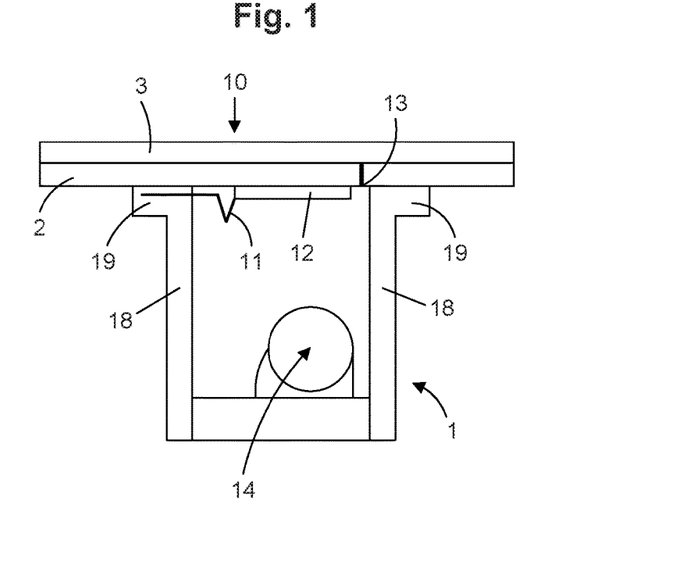
FIG. 1 shows a sectional view of a trim part according to an exemplary embodiment.

FIG. 1 shows a sectional view of a trim part according to the present disclosure. The trim part comprises a carrier 2, on which an airbag module 1 is disposed. The airbag module 1 is composed of an airbag firing channel 18 and an airbag 14. On a side facing the carrier 2, the airbag firing channel 18 has an opening. The airbag firing channel 18 directs the airbag 14 in the direction of the opening during deployment. An airbag flap 12, which is attached to the airbag firing channel 18 by way of an airbag hinge 11, is located in the opening. Furthermore, the carrier 2 is weakened in the region of the opening by a carrier weakening 13. When the airbag 14 is triggered, it is guided by the airbag firing channel 18 in the direction of the carrier 2 so that the airbag 14 pushes against the carrier 2. The airbag 14 breaks through the carrier 2 due to the pressure of the airbag 14 and the weakened region 13 of the carrier 2. The resulting flap 12 is fixed by the carrier 2 due to the airbag hinge 11. A decorative layer 9 is present on the visible side 10 of the carrier 2, so that the airbag system is not visible during normal use.

The airbag module 1 is attached to the carrier 2 by way of several primary and secondary connecting elements, which are not shown. For this purpose, the primary and secondary connecting elements are disposed on the rim 19 of the airbag firing channel 18 which faces the carrier 2. To increase the connecting action, the rim 19 may be designed to be wider than the remaining wall of the airbag firing channel 18. As a result of this type of connection, no further fastening elements may be required on the airbag module 1 or on the carrier 2 to ensure the full and reliable functionality of the airbag 14. In this way, an airbag system can be provided that meets the safety requirements of an airbag 14, while being easier to produce.

Figure 2A:
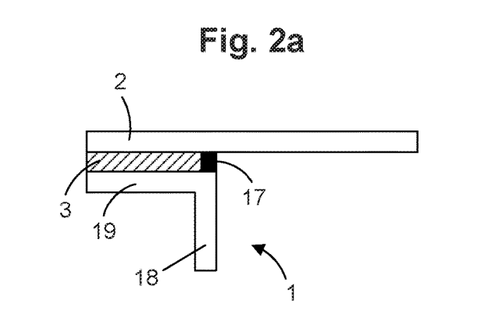
FIGS. 2a and 2b show enlarged illustrations of an exemplary joint region between a carrier and an airbag module.
Figure 2B:
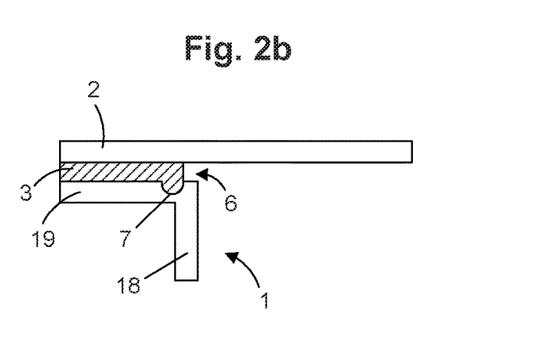

FIGS. 2a and 2b show enlarged illustrations of the trim part according to the present disclosure in a connecting region between the carrier 2 and the airbag module 1. Similarly to the exemplary embodiment of FIG. 1, the airbag module 1 is attached to the carrier 2 by way of the airbag firing channel 18. A joint 6 is formed between the carrier 2 and the airbag firing channel 18. The joint 6 is filled with a primary connecting element 3. In the present exemplary embodiment, the primary connecting element 3 is made of a polyurethane-based adhesive. The adhesive generates a non-detachable connection between the carrier 2 and the airbag module 1. Toward the opening of the airbag firing channel 18, the joint 6 comprises a sealing element 17. The sealing element 17 comprises a rubber seal. The rubber seal ensures that, in particular during production of the trim part, no adhesive enters the airbag firing channel 18 and the adhesive does not impair the deployment of the airbag 14. Instead of a rubber seal, in FIG. 2b a depression 7 is introduced in the rim region 19 of the airbag firing channel 18. The depression 7 creates a kind of trench, which may aid in preventing adhesive that spreads in the direction of the opening of the airbag firing channel 18 from entering the airbag firing channel 18. The depression 7 creates an enlarged cavity, which has to be completely filled with adhesive before adhesive can enter the airbag firing channel 18. Metered use of adhesive in the joint region 6 thus already serves as sufficient precaution against the penetration of adhesive into the opening of the airbag firing channel 18.

Figure 3A:
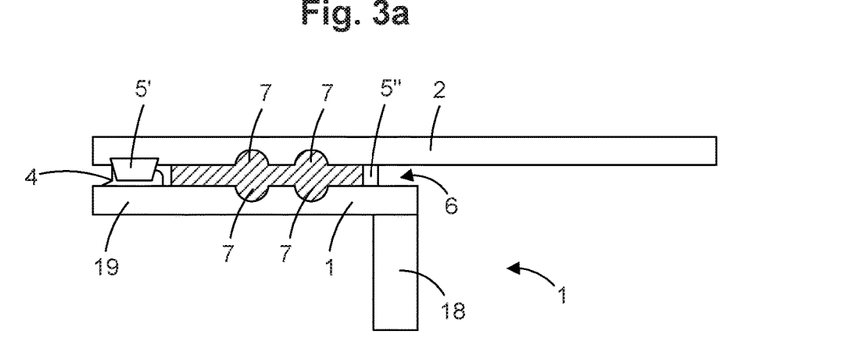
FIGS. 3a to 3d show various embodiments of primary and secondary connecting elements in a joint between the airbag module and the carrier.

FIG. 3a shows a section in the connecting region between the airbag module 1 and the carrier 2 in an enlarged illustration. In addition to the primary connecting element 3, which is made of an adhesive, spacers 5 are disposed in the joint region 6, which enable a defined formation of the joint 6. A spacer 5" is used to seal the joint 6 with respect to the airbag firing channel 18. The spacer 5" accordingly extends around the entire opening rim 18, without interruption. The sealing spacer 5" is designed in one piece with the airbag module 1. A further spacer 5' is disposed at a clear distance from the opening of the airbag firing channel 18. The spacer 5' was applied subsequently to the carrier 2, but prior to arranging the airbag module 1 on the carrier 2. Spacer 5' comprises a secondary connecting element 4 in the form of hot-melt adhesive. The hot-melt adhesive was applied to the spacer 5' in liquid form prior to production. Afterwards, the airbag module 1 was pressed against the carrier 2. The spacer 5', which is provided with hot-melt adhesive, has a lower height than the sealing spacer 5". This is because a gluing gap is preserved for the hot-melt adhesive, as a result of which sufficient adhesive material is still present between the spacer 5' and the airbag module 1 after pressing.

The primary connecting element 3 is disposed between the two spacers 5. Both the airbag module 1 as well as the carrier 2 include depressions 7, which are disposed opposite one another. The depressions 7 create cavities, which are filled by the adhesive of the primary connecting element 3. These cavities or adhesive reservoirs allow local thickened regions of the adhesive layer to be present. These thickened regions increase the bonding action of the adhesive because the adhesive is able to absorb a high amount of energy in these regions.

Figure 3B:
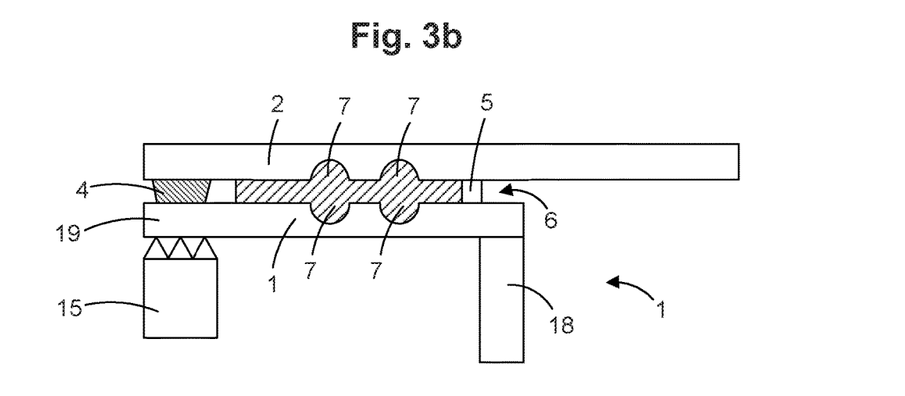

In FIG. 3b, the secondary connecting element 4 is designed as a weld dome. The weld dome can be designed in one piece with the airbag module 1 or with the carrier 2. For the secondary connection, the carrier or the airbag module 1 is locally caused to oscillate by way of an ultrasonic welding device 15 after the airbag module 1 has been pressed against the carrier. The oscillation causes the carrier to heat up and the weld dome melts. In this way, a form-locked connection can be created between the carrier 2 and the airbag module 1, which can serve as a secondary connection 4.

Figure 3C:
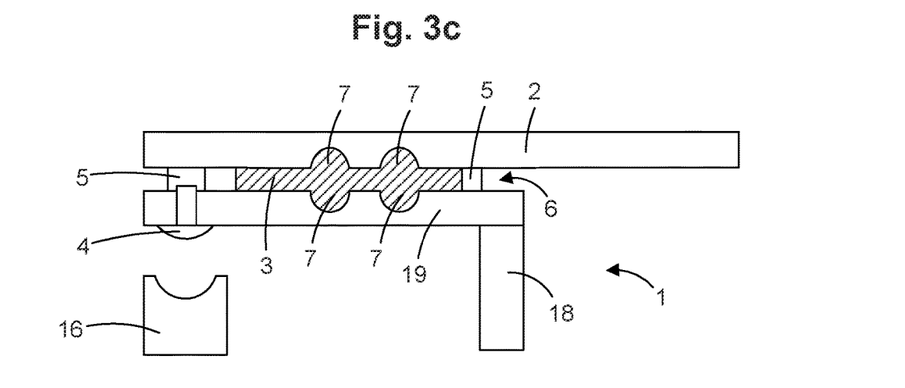

FIG. 3c shows a further alternative embodiment in which the secondary connecting element 4 is formed by a riveted connection. The rivet itself is designed in one piece with the carrier 2, so that the airbag firing channel 18 of the airbag module 1 can be placed with the intended openings onto the rivets. As soon as the airbag firing channel 18 is positioned, the projection of the rivets is appropriately deformed by way of a corresponding riveting device, and the airbag firing channel 18 or the airbag module 1 is thereby fixed to the carrier 2. Using such a connecting element as the secondary connecting element 4 allows rapid pre-fixing to take place, and also allows the airbag module to be positioned easily and securely on the carrier 2.

Figure 3D:
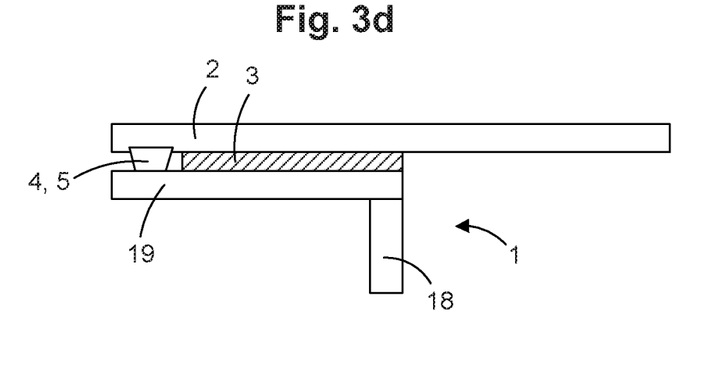

FIG. 3d shows a further alternative embodiment of the trim part according to the present disclosure, in which the primary connecting element 3 is formed by an adhesive tape. The primary connecting element 3 thus includes a dimensionally stable substrate, on which an adhesive is provided at least in sections. Such a connecting element may be easier to handle, and thus easier to process. Additionally it is possible to use an adhesive that has a considerably shorter reaction time compared to pasty adhesives. Since, moreover, the adhesive may not flow on an adhesive tape, sealing in the direction of the airbag firing channel may be unnecessary.

Figure 4A:
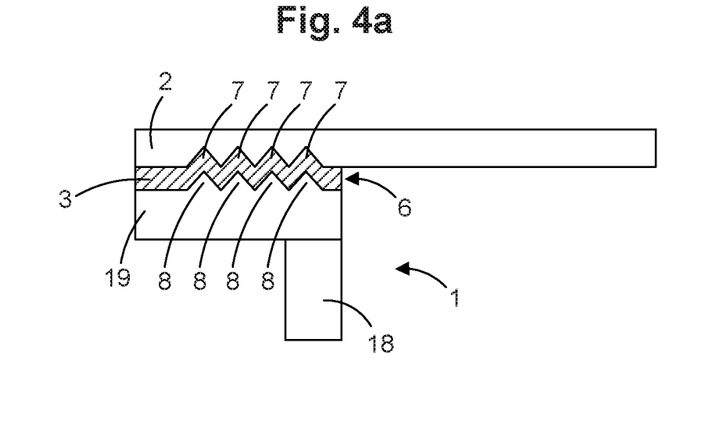
FIGS. 4a and 4b show various embodiments of depressions in the carrier or in the airbag module in the region of the joint.
Figure 4B:
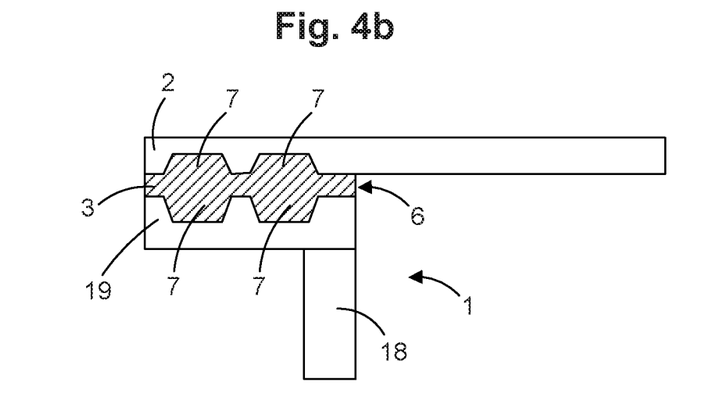

FIGS. 4a and 4b show alternative embodiments of depressions 7 in the carrier 2 or airbag module 1. FIG. 4a, for example, shows a trim part in which depressions 7 are provided in the carrier 2. In contrast, elevations 8 are introduced in the airbag firing channel 18 of the airbag module 1 opposite the depressions 7. These elevations 8 serve as guide ribs and thus distribute the adhesive. This ensures the adhesive is pressed by the elevations 8 into the depressions 7.

FIG. 4b shows a further alternative embodiment of the trim part in a sectional view, in which large depressions 7 having a channel-like cross-section are introduced into the carrier 2 and the airbag module 1. These depressions 7 are disposed opposite one another and close next to each other. This arrangement can be useful when particularly high mechanical forces are expected to act on the connection.

While the present disclosure is illustrated and described in detail according to the above embodiments, the present disclosure is not limited to these embodiments and additional embodiments may be implemented. Further, other embodiments and various modifications will be apparent to those skilled in the art from consideration of the specification and practice of one or more embodiments disclosed herein, without departing from the scope of the present disclosure.

LIST OF REFERENCE NUMERALS

1 Airbag module
2 Carrier
3 Primary connecting element
4 Secondary connecting element
5 Spacer
6 Joint
7 Depressions
8 Elevations
9 Decorative layer
10 Visible side
11 Airbag hinge
12 Airbag flap
13 Carrier weakening
14 Airbag
15 Ultrasonic welding device
16 Welding device
17 Sealing element
18 Airbag firing channel
19 Rim

What is claimed is:

1. A trim part having an airbag system for the interior of a motor vehicle, the trim part comprising:
   a carrier;
   an airbag module disposed on the carrier;
   a joint formed between the carrier and the airbag module at least in sections;
   a primary connecting element disposed within the joint, wherein the primary connecting element includes an adhesive for non-detachably connecting the carrier to the airbag module;
   a secondary connecting element configured to temporarily fix the airbag module to the carrier before the non-detachable connection between the carrier and the airbag module is created by the primary connecting element; and
   a spacer disposed between the airbag module and the carrier.

2. The trim part according to claim 1, wherein the primary connecting element includes a dimensionally stable substrate and the dimensionally stable substrate is covered by the adhesive.

3. The trim part according to claim 1, wherein the adhesive of the primary connecting element is a pressure-sensitive adhesive.

4. The trim part according to claim 1, wherein the secondary connecting element is disposed in or on the spacer.

5. The trim part according to claim 1, wherein at least one of the carrier or the airbag module includes one or more depressions in the region of the joint, and the one or more depressions are filled at least partially by the primary connecting element.

6. The trim part according to claim 1, wherein the airbag module includes an airbag firing channel having an opening facing the carrier.

7. The trim part according to claim 6, further comprising:
   a sealing element disposed between the carrier and the airbag module within the joint, wherein the sealing element is configured to seal the joint with respect to the airbag firing channel.

8. The trim part according to claim 1, wherein the joint has a width of 1 to 5 millimeters.

9. The trim part according to claim 1, wherein the secondary connecting element is disposed within the joint and is spatially separated from the primary connecting element.

10. The trim part according to claim 1, wherein the secondary connecting element is formed as a single piece with at least one of the carrier or the airbag module.

11. The trim part according to claim 1, wherein the secondary connecting element includes a heat-activatable adhesive, and the adhesive of the secondary connecting element is different from the adhesive of the primary connecting element.

12. The trim part according to claim 1, wherein at least one of the carrier or the airbag module includes guide ribs in the region of the joint, and the guide ribs are configured to distribute the adhesive of the primary connecting element in the joint.

13. A trim part having an airbag system for the interior of a motor vehicle, the trim part comprising:
   a carrier;

an airbag module disposed on the carrier;

a joint formed between the carrier and the airbag module at least in sections;

a primary connecting element disposed within the joint, the primary connecting element comprising an adhesive for non-detachably connecting the carrier to the airbag module; and a secondary connecting element disposed within the joint and configured to temporarily fix the airbag module to the carrier, the secondary connecting element being spatially separated from the primary connecting element.

14. The trim part according to claim 13, wherein a spacer is disposed between the airbag module and the carrier.

15. The trim part according to claim 14, wherein the secondary connecting element is disposed in or on the spacer.

16. A trim part having an airbag system for the interior of a motor vehicle, the trim part comprising:

a carrier;

an airbag module disposed on the carrier, the airbag module comprising an airbag firing channel having an opening facing the carrier;

a joint formed between the carrier and the airbag module at least in sections;

a primary connecting element disposed within the joint, the primary connecting element comprising an adhesive for non-detachably connecting the carrier to the airbag module;

a secondary connecting element configured to temporarily fix the airbag module to the carrier; and a sealing element disposed between the carrier and the airbag module within the joint, the sealing element being configured to seal the joint with respect to the airbag firing channel.

17. The trim part according to claim 16, wherein a spacer is disposed between the airbag module and the carrier.

18. The trim part according to claim 17, wherein the secondary connecting element is disposed in or on the spacer.

19. The trim part according to claim 16, wherein the secondary connecting element is disposed within the joint and is spatially separated from the primary connecting element.

* * * * *